Patented Aug. 18, 1931

1,819,878

UNITED STATES PATENT OFFICE

HENRY V. DUNHAM, OF MOUNT VERNON, NEW YORK, ASSIGNOR, BY MESNE ASSIGNMENTS, TO THE CASEIN MANUFACTURING COMPANY OF AMERICA, INC., OF NEW YORK, N. Y., A CORPORATION OF DELAWARE

PROCESS OF PRODUCING LOW VISCOSITY CASEIN

No Drawing.   Application filed December 15, 1922. Serial No. 607,221.

This process has for its object the production of alkaline or neutral casein solutions of low viscosity.

It is well known that the various grades of commercial casein such as cooked casein, pressed casein, rennet casein, self-soured casein, etc., when dissolved in water with the addition of borax, sodium carbonate, ammonia or other alkalies commonly employed for this purpose, yield solutions which exhibit different degrees of viscosity according to the character of the casein and the solvent.

It is also generally known that a comparison of the alkaline solutions of the varieties of casein referred to, under equal conditions of temperature and concentration, shows that a very high viscosity is possessed by the solution of cooked casein and the lowest viscosity by the solution of self-soured casein, while rennet casein possesses a very high viscosity due particularly to its partial insolubility in alkalies.

For some of the arts in which casein is utilized, notably in paper coating and in the manufacture of certain water-proof glues, high viscosity of the solution is objectionable, and the paste obtained from some of the commercial grades of casein is practically unfit for use.

In the process to be described, casein solutions of greatly reduced viscosities are produced by a method involving the pre-treatment of the casein. Even self-soured casein, which ordinarily yields a solution of moderate viscosity suitable for most purposes, is improved by this pre-treatment. By this process, also, rennet casein is rendered easily soluble in the alkalies usually employed for dissolving casein.

My process consists in the addition of relatively small amounts of water-soluble acids or acid-reacting salts prior to the use of alkalies or other solvents for the dissolving of the casein. Different acids or acid-reacting salts affect in varying degree the ultimate viscosity of the casein solution, and I may vary the kind, concentration and amount of the acids or acid-reacting salts used, according to the character of the casein employed and the purpose for which the product is to be used to give a final product having the desired viscosity.

It may be noted that when used in small amounts most acids and most acid-reacting soluble salts do not dissolve casein, at least to any great extent. There are some exceptions however, such as the alkali metal fluoborates as described in my prior Patent No. 1,347,845, and it is found that the acid solutions of casein in fluoborate solutions show a slightly lower degree of viscosity than would be produced by substituting the same proportion or a smaller proportion of an alkali in the place of the fluoborate (using the same kind of casein in the same proportion). It is also well known that many strong acids, such as strong acid (say 80 to 85%) or strong sulfuric acid, (say 85% or over), will dissolve casein, if used in large amounts. However these also destroy the casein more or less on standing even for a short time, and if to such a strong acid solution, a large amount of water were added immediately after dissolving, casein would be precipitated, but it would be so altered as to be wholly unsuited for most of the purposes for which casein is commonly used. Also of course such a solution of casein in strong acid could not be used for paper-coating or the like.

In the present process, acids or acid-reacting water-soluble salts in which casein is substantially insoluble in the amount used, are preferred. The acid is also preferably used in a dilute condition.

As examples of the procedure the following may be given:

From 3 to 6 parts by weight of phosphoric acid having a concentration of 85% are diluted with about 10 to 20 parts of water. This produces phosphoric acid solution of about 19-20% strength. The dilute solution is then added slowly to 300 parts of precipitated casein in the condition of lumps of the size commonly employed for spreading on drying trays (the casein, containing approximately 60% of moisture), and the whole well mixed together. The casein may then be dried and ground in the usual way. The resulting product upon dissolving by any of the methods commonly practiced in the casein art gives a solution of much lower viscosity than that obtained from the original untreated casein (whether dried or not) similarly dissolved. (The amount of actual phosphoric acid will be seen to be about 2 to 4%, on the weight of the dry casein.)

In this example it will be seen that 1 to 2 parts of actual phosphoric acid diluted with 4 to 8 parts of water are added to about 120 parts of wet casein actually containing 48 parts of casein with 72 parts of water or in other words, the concentration is 1 to 2 parts of actual phosphoric acid to 76 to 80 parts of water to 48 parts of casein, the dilution of the phosphoric acid with water being about 1/80 to 2/76 or about 1.25 to 2.6%. Likewise the concentration of acid to casein plus water would be about 1/128 to 2/124 or roughly 0.8 to 1.6%. Alternatively, the acid solution may be added to dry casein with efficient mixing. The amount of liquid so added is generally not more than sufficient to slightly moisten the casein, and is so readily absorbed that little or no drying of the product is necessary.

As an example, 3 to 6 parts of phosphoric acid (85%) diluted with 10 to 20 parts of water (forming dilute phosphoric acid of about 19 to 20% strength) are added to 100 parts of dry, ground casein and thoroughly stirred say for about five minutes. The material is then ready to ship. If preferred, it may be dried and then (or subsequently) mixed with sufficient alkali to render it alkaline. For instance, in this example, 20 pounds of borax may be added to 100 pounds of the casein product. (The amount of actual phosphoric in this example will be seen to be about 2.5 to 5%.)

Rennet casein treated as in the above examples is found to have a much greater solubility in alkalies, and its solutions possess a markedly diminished viscosity. It will be understood that, if desired, more water may be used in any of the above mentioned examples, but in that case there is the added expense of removing the excess water and further drying of the finished casein in case it is desired to ship or store the same in a dry condition.

Other acids which impart to casein the property of forming mobile solutions when treated with a casein solvent, such as hydrochloric, sulphuric, formic, hydrofluoric acids, etc., or mixtures of the same; or, similarly, water-soluble acid-reacting salts alone, or mixed together, or in admixture with an acid or acids, may be used.

As examples of suitable acid-reacting salts, may be cited sodium bisulfate, mono-calcium phosphate, zinc sulfate, ammonium persulfate, etc.

In all cases it is advisable to let the acidified material stand for a while, say a day or more, before dissolving the casein in alkali solution. In the case of the rennet casein, this is quite necessary in order that the acid-reacting material may fully act on the casein, to produce a readily soluble product.

If sodium fluoborate having an acid reaction, (mentioned in my prior patent above referred to) were to be added, in proportion of 1 to 5% to the dry casein, and the latter then dissolved by the use of alkali, this would produce a solution having only very slightly less viscosity than that produced by dissolving that same casein in an alkali solution. This may be due to the fact that the acidity of the fluoborate is of a low order of strength.

Many of the properties of the casein solutions other than their viscosity do not appear to be materially affected; the adhesiveness of the solution, for instance, is not impaired by the pretreatment of the casein.

The examples given above can of course be varied depending on the degree of viscosity desired, quality of casein used and purpose for which the resulting product is to be employed. My invention is based upon my discovery that many of the acids and acid-reacting salts possess the property of reducing the viscosity of casein when used as described above, some acids and acid reacting salts have in this respect more effect than others and some do not show any effect or only a very slight effect, as regards the viscosity.

In the description and claims, the term "soluble", of course is intended to mean, soluble in water.

In the examples, I have referred to the use of dilute acids. The acids are preferably used in a dilute condition in order to be readily thoroughly mixed with the casein, in order to give the acid a chance to cause the desired reaction on casein and of course to prevent injury to the casein by the action of strong acids.

In the examples, I have given certain figures which have been found to give excellent results. I wish it understood however, that the invention is not restricted to these exact figures and that the quantities can be varied between wide limits.

I claim:

1. A process producing a mobile solution of casein, which comprises treating precipitated casein out of contact with the bulk of the liquid of origin, with a dilute solution of an acid material, the ratio of actual acid to water in the mixture being over 1.25%, and the amount of such acid material corresponding to between about 2% and about 5% of phosphoric acid, based on the amount of casein, such acid material, in the amount and concentration used, being incapable of dissolving the casein, drying the product and thereafter treating the product with a casein solvent.

2. A process of producing solutions of casein having a low viscosity which comprises precipitating casein by a method other than solely adding mineral acid to the milk, treating the casein after separation from the whey with a dilute solution of phosphoric acid, the concentration of phosphoric acid to water being over 1.25% in the mixture, but the concentration and amount of said acid material being insufficient to dissolve any substantial portion of the casein, drying the product, and thereafter treating the casein with an alkaline-reacting casein-solvent.

3. A process of producing solutions of casein having a low viscosity which comprises precipitating casein, treating the casein after precipitation and after separation from the whey, with a fraction only of its weight of a dilute acid solution in which casein is substantially insoluble, the ratio of acid to water at that stage being over 1.25%, and thereafter treating the casein with a casein-solvent.

4. A process which comprises treating rennet casein with a fraction only of its weight of an acid material, the concentration of acid to water at this stage being over 1.25%, based on total water present but being too low to dissolve the casein, allowing the acid material to permeate the particles of casein, and thereafter dissolving the casein in an alkaline solvent, the amount and concentration of such acid material being sufficient to lower the viscosity of the solution produced from the casein but insufficient to dissolve the casein.

5. A process which comprises treating rennet casein with an acid material which is not a normal constituent of sweet milk and which is not a normal constituent of sour milk, such treatment being out of contact with the bulk of the liquid of origin, the amount of such acid material corresponding to about 2 to 5% of phosphoric acid and the concentration of such acid material, relative to the total water present, being substantially over 1.25%, and drying the product.

6. A process which comprises treating dry precipitated casein with a fraction only of its weight of a mineral acid, the concentration of acid to water at this stage being over 1.25%, based on total water present and the amount of actual acid being between about 2% and 5.1% of the actual casein present, allowing the acid material to permeate the particles of casein, drying the product, and thereafter dissolving the casein in an alkaline solvent, the amount of such acid being insufficient to dissolve the casein but sufficient to lower the viscosity of the solution subsequently produced from the casein.

7. A treated casein product containing rennet casein and a sufficient quantity of a soluble acid material to produce a casein which is insoluble in water and has the property of producing a solution possessing a substantially lower degree of viscosity when dissolved in an alkaline casein solvent, than ordinary rennet casein of the same grade but without said acid material.

8. A process of producing solutions of casein having a low viscosity, which comprises treating rennet casein or self-soured casein with a dilute acid solution in amount and concentration insufficient to dissolve said casein, but not below 1.25% strength, based on the total water present, drying the product, and thereafter treating the casein with a casein solvent under conditions to note the viscosity of the solution.

9. A process of producing solutions of casein having a low viscosity which comprises treating rennet casein or self-soured casein, out of contact with the whey, with a dilute solution of a soluble acid material, the concentration of acid to water being over 1.25% in the mixture, but the concentration and amount of said acid material being insufficient to dissolve any substantial portion of the casein, drying the product, and thereafter treating the casein with an alkaline-reacting casein-solvent.

10. A treated casein product containing casein and a soluble acid material in amount chemically equivalent to 2 to 5% of phosphoric acid based upon the weight of the casein, the concentration of acid with respect to any water in said product being at least 1.25%, which product is insoluble in water and has the property of producing a solution possessing a substantially lower degree of viscosity when dissolved in an alkaline casein solvent than ordinary casein of the same grade but without said acid material.

In testimony whereof I affix my signature.

HENRY V. DUNHAM.